(12) United States Patent
Lee

(10) Patent No.: US 10,536,044 B2
(45) Date of Patent: Jan. 14, 2020

(54) ROTOR ASSEMBLY AND MOTOR INCLUDING SAME

(71) Applicant: LG INNOTEK CO., LTD., Seoul (KR)

(72) Inventor: Joung Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 61 days.

(21) Appl. No.: 15/775,703

(22) PCT Filed: Nov. 14, 2016

(86) PCT No.: PCT/KR2016/013067
§ 371 (c)(1),
(2) Date: May 11, 2018

(87) PCT Pub. No.: WO2017/082704
PCT Pub. Date: May 18, 2017

(65) Prior Publication Data
US 2018/0337569 A1 Nov. 22, 2018

(30) Foreign Application Priority Data
Nov. 12, 2015 (KR) .................. 10-2015-0158853

(51) Int. Cl.
*H02K 11/00* (2016.01)
*H02K 1/24* (2006.01)
(Continued)

(52) U.S. Cl.
CPC .............. *H02K 1/24* (2013.01); *H02K 3/527* (2013.01); *H02K 5/225* (2013.01); *H02K 7/003* (2013.01); *H02K 9/00* (2013.01)

(58) Field of Classification Search
CPC .......... H02K 1/24; H02K 3/527; H02K 5/225; H02K 3/38; H02K 9/04; H02K 9/00; H02K 7/003
(Continued)

(56) References Cited

U.S. PATENT DOCUMENTS 4,565,936 A * 1/1986 Ikegami ................. H02K 13/02
310/263
5,235,229 A * 8/1993 Tanaka ..................... H02K 9/06
310/62
(Continued)

FOREIGN PATENT DOCUMENTS

JP  2002-291185 A  10/2002
JP  2002-335661 A  11/2002
(Continued)

OTHER PUBLICATIONS

International Search Report in International Application No. PCT/KR2016/013067, filed Nov. 14, 2016.

*Primary Examiner* — Thanh Lam
(74) *Attorney, Agent, or Firm* — Saliwanchik, Lloyd & Eisenschenk

(57) ABSTRACT

The present invention provides a rotor assembly comprising: a rotor including a core body, and a plurality of protrusion parts coupled to the core body so as to be detachable therefrom; and an insulator including a body encompassing the protrusion parts, and blades formed to protrude from the upper and lower surfaces of the body, thereby providing an advantageous effect of reducing the number of parts to be manufactured such that manufacturing costs and manufacturing processes can be reduced.

8 Claims, 7 Drawing Sheets

(51) Int. Cl.
   *H02K 3/52*   (2006.01)
   *H02K 5/22*   (2006.01)
   *H02K 7/00*   (2006.01)
   *H02K 9/00*   (2006.01)

(58) Field of Classification Search
   USPC .......................... 310/71, 52, 59, 216.1–265
   See application file for complete search history.

(56) References Cited

U.S. PATENT DOCUMENTS

| | | | | |
|---|---|---|---|---|
| 5,705,865 | A * | 1/1998 | Ishida | H02K 9/06 |
| | | | | 310/263 |
| 6,815,864 | B2 * | 11/2004 | Tanaka | H02K 21/044 |
| | | | | 310/156.21 |
| 8,120,227 | B2 * | 2/2012 | Leroy | H02K 9/06 |
| | | | | 310/214 |
| 2005/0285459 | A1 * | 12/2005 | Ishida | F04D 29/282 |
| | | | | 310/62 |
| 2015/0097464 | A1 | 4/2015 | Welch et al. | |
| 2016/0164374 | A1 * | 6/2016 | Yang | H02K 9/02 |
| | | | | 310/59 |

FOREIGN PATENT DOCUMENTS

| | | |
|---|---|---|
| JP | 2014-117020 A | 6/2014 |
| KR | 10-2007-0002013 A | 1/2007 |
| WO | WO-2005/091465 A2 | 9/2005 |

* cited by examiner

ROTOR ASSEMBLY AND MOTOR INCLUDING SAME

CROSS-REFERENCE TO RELATED APPLICATIONS

This application is the U.S. national stage application of International Patent Application No. PCT/KR2016/013067, filed Nov. 14, 2016, which claims priority to Korean Application No. 10-2015-0158853, filed Nov. 12, 2015, the disclosures of each of which are incorporated herein by reference in their entirety.

TECHNICAL FIELD

The present invention relates to a rotor assembly and a motor including the same, and more particularly, to a rotor assembly in which coils are wound and a motor including the rotor assembly.

BACKGROUND ART

Generally, a vehicle is provided with a starter motor for revving an engine thereof and with an alternator for generating electricity using the rotational force of the engine. In a starter motor, an ignition switch is connected to a battery as a power source by an operation of a driver when a vehicle is started, and a driving force, which is generated by supplying power to the starter motor through the ignition switch, rotates an engine to start the engine.

On the other hand, an alternator is connected to a driving unit of the engine, a rotor is rotated by the driving force of the engine in a state in which a magnetic field is formed, so that an alternating current power is generated, and the battery is charged with the generated alternating current power using a rectifier or the like.

Both the starter motor and the alternator are configured to have a structure of a stator and a rotor, and structures thereof are very similar. The starter motor and the alternator may operate as generators or motors according to whether force is applied or electric power is applied.

Recently, research has been actively conducted on a structure of a belt driven starter generator (BSG) (hereinafter referred to as BSG) which serves as both a starter motor and an alternator in one structure.

Meanwhile, a rotor-winding synchronous type motor is a motor in which coils are wound around a protrusion protruding from an outer circumferential surface of a rotor core, and is mainly used as a generator. Recently, however, the development of non-rare earth motors has received attention, and has been proposed as a form of traction motor.

Coils wound around the rotor are connected through terminals of a bus bar disposed on the rotor. Further, blades may be provided on the rotor to cool heat that is generated in the coils wound around the rotor. However, since a configuration of the rotor is complex, there are problems in that manufacturing processes of the rotor are complex and manufacturing costs are increased due to an increase in the number of parts.

DISCLOSURE

Technical Problem

The present invention is directed to providing a rotor assembly having a simple configuration in which manufacturing processes thereof are simplified and the number of parts is reduced, in a structure for cooling coils wound around a rotor, and a motor including the same.

The scope of the present invention is not limited to the above-described object, and other unmentioned objects may be clearly understood by those skilled in the art from the following descriptions.

Technical Solution

One aspect of the present invention provides a rotor assembly including a rotor core around which coils are wound, and a bus bar including terminals connected to the coils and a body, which is disposed on the rotor core and coupled to the terminals and includes blades.

The blades may protrude from an upper surface of the body.

The body may include an inner body including the terminals therein so that connection ends of the terminals are exposed to an outside, and including a shaft hole formed at a center thereof, an outer body disposed outside the inner body and having the blades formed therein, and a connecting part configured to connect the inner body to the outer body.

The blades may be formed to be inclined so as to form an angle of attack with respect to a reference line formed in a radial direction at a center of rotation of the rotor core.

The outer body may include a cooling hole formed to pass through from a lower surface thereof to the upper surface.

The cooling hole may be disposed between the blades which are adjacent to each other with respect to a circumferential direction of the rotor core.

The terminals may include a terminal body formed in an annular shape, and the connection ends of the terminals may be arranged in a periphery of the terminal body.

Another aspect of the present invention provides a motor including a rotor assembly including a rotor core around which coils are wound, and a bus bar including terminals connected to the coils and a body, which is disposed on the rotor core and coupled to the terminals and includes blades, a stator disposed outside the rotor assembly, and a rotation shaft coupled to the body.

The blades may protrude from an upper surface of the body.

The body may include an inner body including the terminals therein so that connection ends of the terminals are exposed to an outside, and including a shaft hole formed at a center thereof, an outer body disposed outside the inner body and having the blades formed therein, and a connecting part configured to connect the inner body to the outer body.

The blades may be formed to be inclined so as to form an angle of attack with respect to a reference line formed in a radial direction at a center of rotation of the rotor core.

The outer body may include a cooling hole formed to pass through from a lower surface thereof to the upper surface.

The cooling hole may be disposed between the blades which are adjacent to each other with respect to a circumferential direction of the rotor core.

The terminals may include a terminal body formed in an annular shape, and the connection ends of the terminals may be arranged in a periphery of the terminal body.

Advantageous Effects

According to an embodiment of the present invention, a bus bar disposed on a rotor and a fan are integrally molded to provide a simple configuration, and thus advantageous effects of simplified manufacturing processes and a reduced number of parts can be provided.

MODES OF THE INVENTION

Hereinafter, exemplary embodiments of the present invention will be described in detail with reference to the accompanying drawings. Purposes, specific advantages, and novel features of the present invention will be made clear from exemplary embodiments and the following detailed descriptions in connection with the accompanying drawings. Moreover, terms and words used in this specification and claims should not be interpreted as limited to commonly used meanings or meanings in dictionaries and should be interpreted with meanings and concepts which are consistent with the technological scope of the present invention based on the principle that the inventors have appropriately defined concepts of terms in order to describe the present invention in the best way. In descriptions of the present invention, when detailed descriptions of related well-known technology are deemed to unnecessarily obscure the gist of the present invention, they will be omitted.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Figure 1:
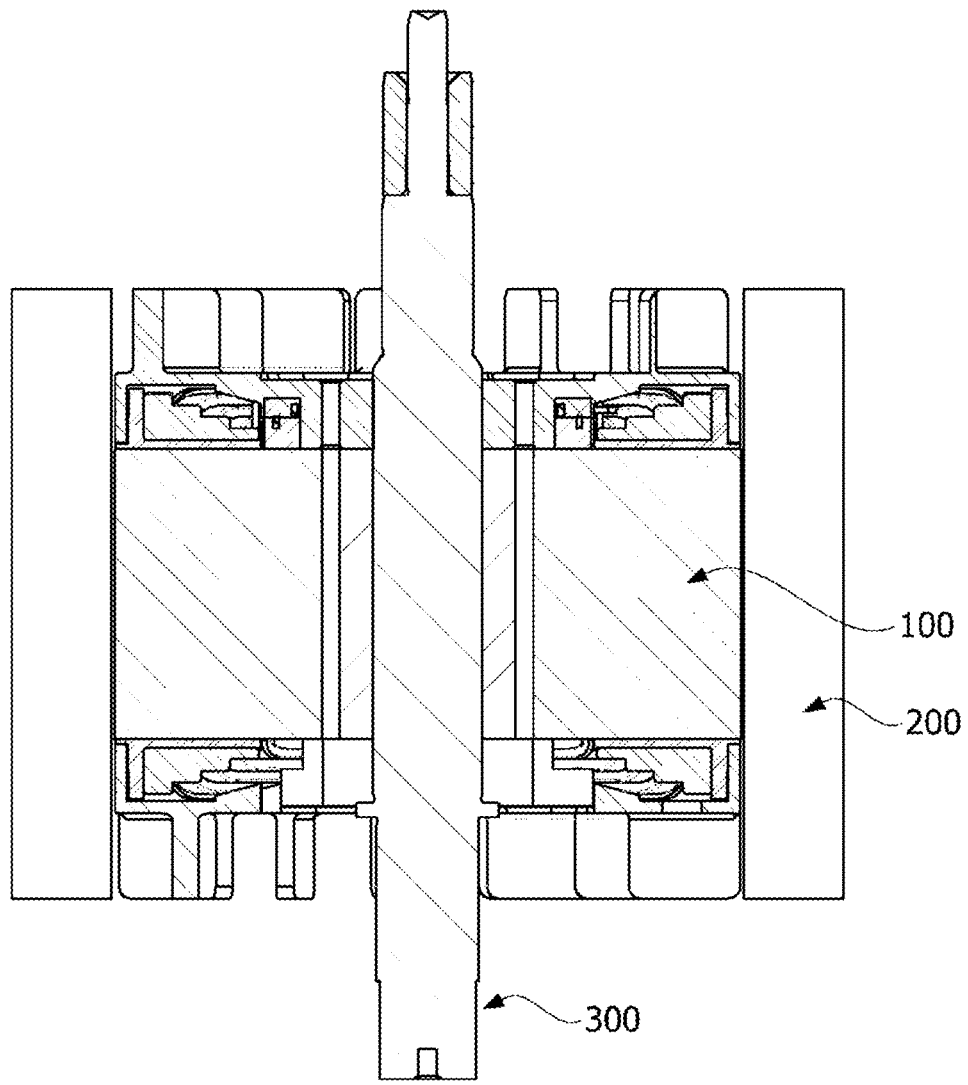
FIG. 1 is a view showing a motor according to an exemplary embodiment of the present invention.

FIG. 1 is a view showing a motor according to an exemplary embodiment of the present invention.

Referring to FIG. 1, the motor may include a rotor assembly 100, a stator 200, and a rotation shaft 300.

The rotor assembly 100 may be provided inside the stator 200 and coils may be wound around the rotor assembly 100. The coils may cause an electrical interaction with the stator 200 to induce rotation of the rotor assembly 100, or electric power generation may be induced by the rotating rotor assembly 100.

Specifically, when the motor operates as a starter motor, the rotor assembly 100 is rotated by an applied driving current to rotate a pulley belt (not shown) of the rotor assembly 100, which is connected to the rotation shaft 300, and thus an external part (such as an engine or the like) is driven. In this case, the pulley belt may be connected to a crankshaft of an engine in a vehicle.

On the other hand, when the motor operates as an alternator, a pulley belt (not shown) is rotated by driving of an engine to rotate the rotor assembly 100, and an alternating current is generated. The generated alternating current may be converted into a direct current and supplied to an external part (such as a battery or the like).

Figure 2:
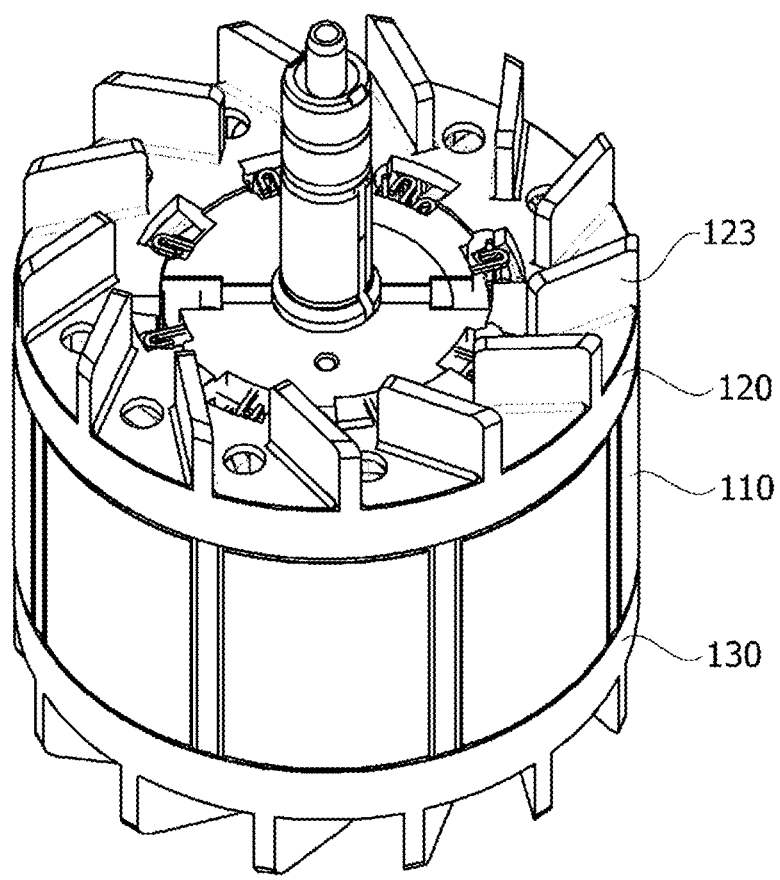
FIG. 2 is a perspective view showing a rotor assembly shown in FIG. 1.
Figure 3:
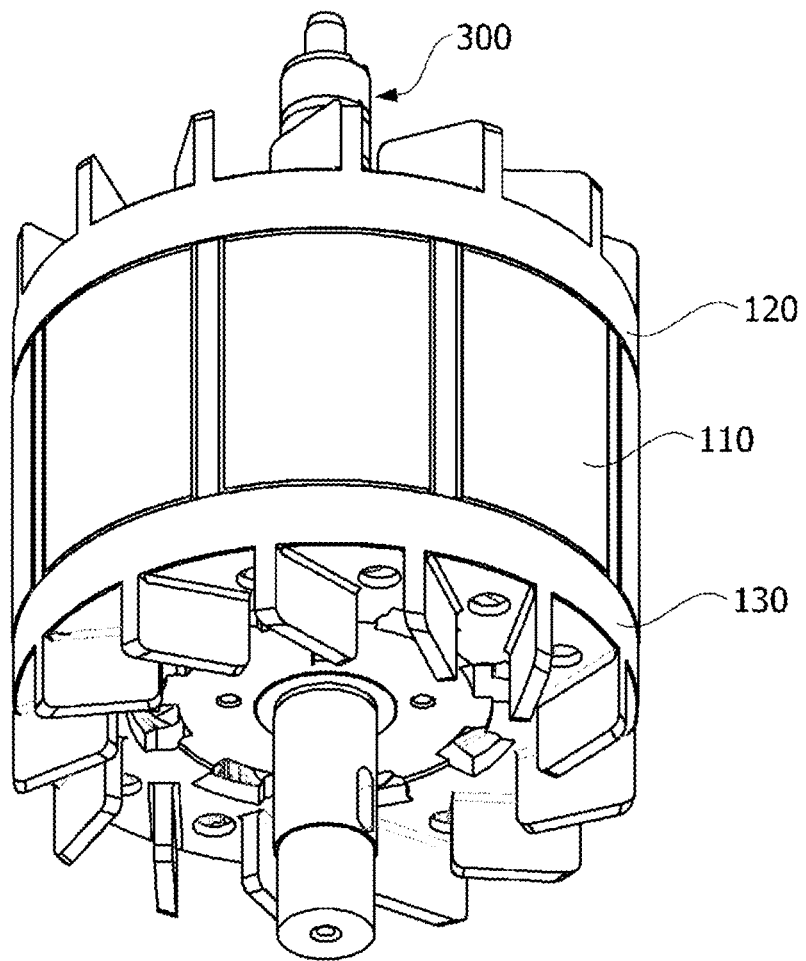
FIG. 3 is a bottom view showing the rotor assembly shown in FIG. 2.
Figure 4:
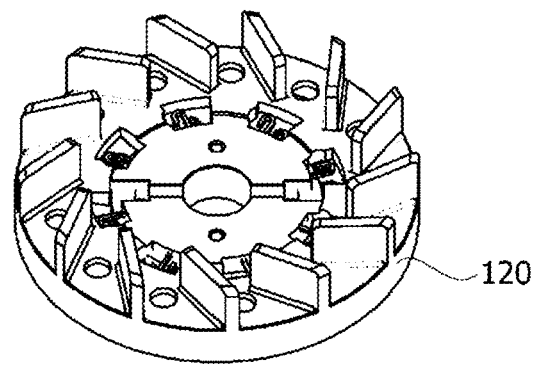
FIG. 4 is an exploded view of the rotor assembly.
Figure 4:
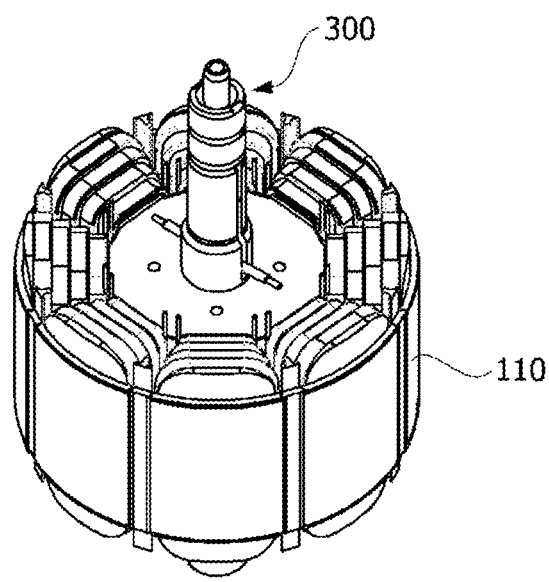
Figure 4:
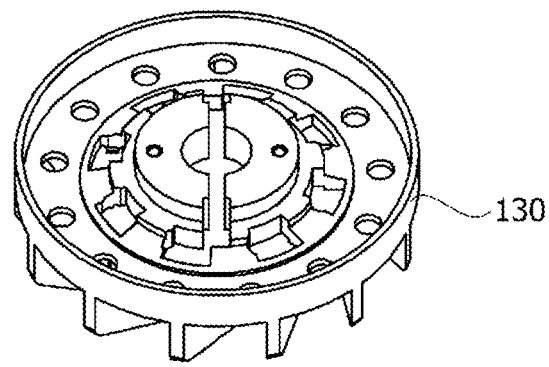

FIG. 2 is a perspective view showing the rotor assembly shown in FIG. 1, FIG. 3 is a bottom view showing the rotor assembly shown in FIG. 2, and FIG. 4 is an exploded view of the rotor assembly.

As shown in FIGS. 2 to 4, the rotor assembly 100 according to the exemplary embodiment of the present invention may include a rotor core 110, a bus bar 120, and a fan 130 member. The bus bar 120 may be disposed above the rotor core 110, and the fan 130 member may be disposed below the rotor core 110.

The rotor core 110 may be formed by stacking a plurality of plates. A plurality of protrusions may be formed in the rotor core 110, and coils may be wound around each of the protrusions. The protrusions may be arranged in a periphery of the cylindrical rotor core at regular intervals. The rotation shaft 300 is inserted in a center of the rotor core.

Figure 5:
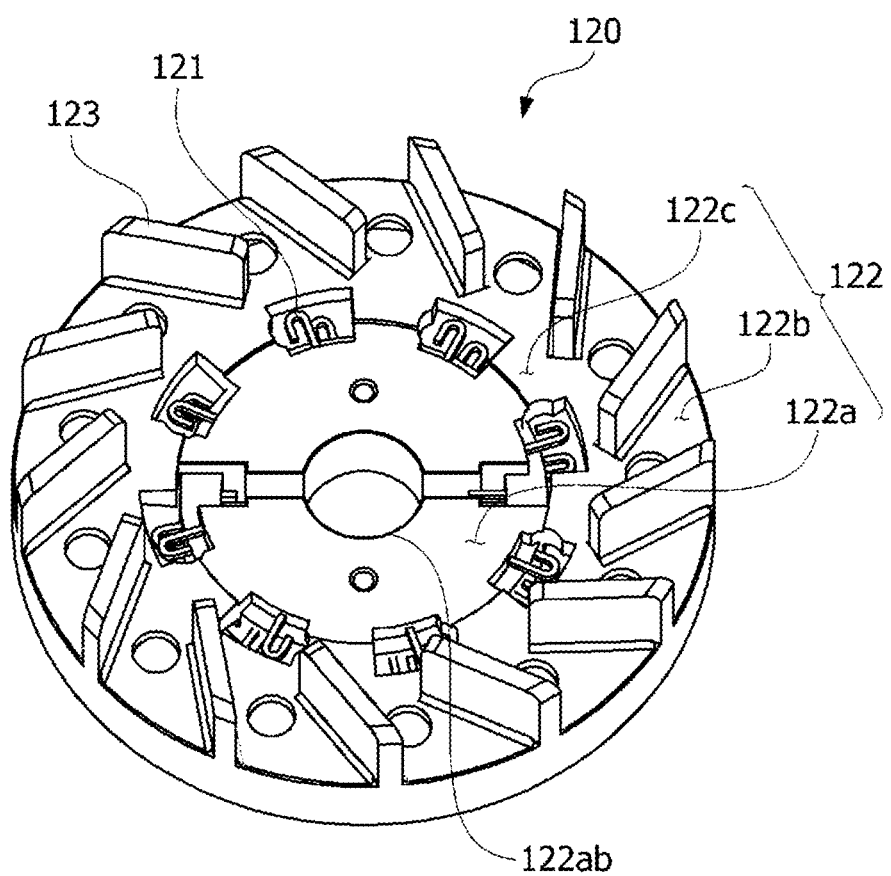
FIG. 5 is a view showing a bus bar.
Figure 6:
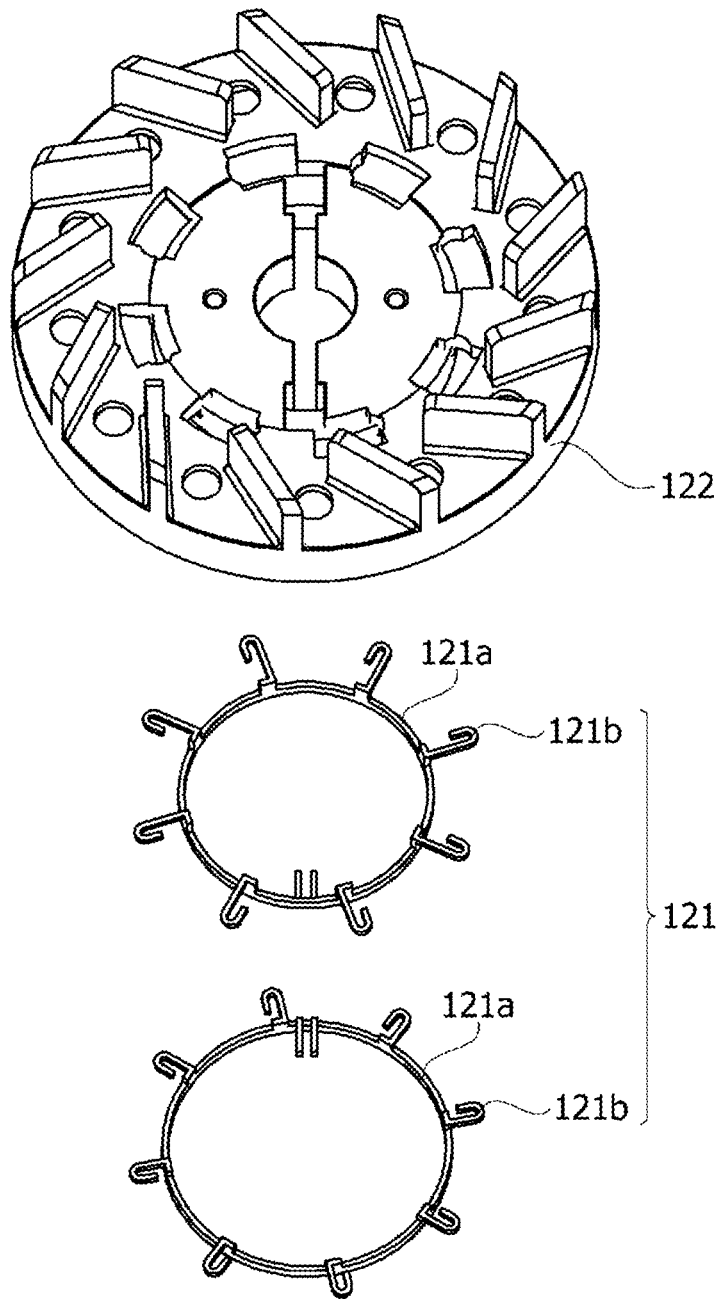
FIG. 6 is an exploded view of the bus bar shown in FIG. 5.

FIG. 5 is a view showing the bus bar, and FIG. 6 is an exploded view of the bus bar shown in FIG. 5. In FIGS. 5 and 6, only main feature parts are shown in order to conceptually and clearly understand the present invention. Therefore, various modifications of the illustration are expected, and the scope of the present invention need not be limited by specific shapes shown in the drawings.

Referring to FIGS. 5 and 6, the bus bar 120 may include terminals 121, a body 122, and blades 123. Here, the body 122 and the blades 123 may be injected to be formed as an integral part, and the terminals 121 may be insert-injected into the body 122 and the blades 123 to be formed as an integral part.

The terminals 121 may connect the coils wound around the rotor core 110 to be parallel, and two terminals 121 may be provided. Each of the terminals 121 may include a terminal body 121a and connection ends 121b. The terminal body 121a may be formed in an annular shape, and the connection ends 121b may be arranged in a periphery of the terminal body 121a at regular intervals.

The body 122 may be formed as a disc-shaped plate. The body 122 is disposed on the rotor core 110 and includes the terminals 121 therein. The blades 123 protrude from the body 122.

The body 122 may include an inner body 122a, an outer body 122b, and connecting parts 122c. The outer body 122b is disposed outside the inner body 122a and the connecting parts 122c serve to connect the inner body 122a to the outer body 122b. Here, the inner body 122a, the outer body 122b, and the connecting parts 122c may be separately described according to shapes and functional characteristics thereof, but are one means in which the inner body 122a, the outer body 122b, and the connecting parts 122c are longitudinally connected to each other.

The inner body 122a may include the terminals 121 so that the connection ends 121b are exposed to an outside. Further, the inner body 122a may include a shaft hole 122ab formed at a center thereof.

The outer body 122b may be disposed apart from the outside of the inner body 122a and disposed in a periphery of the inner body 122a. The outer body 122b may be embodied in the form of an annular plate, entirely including the inner body 122a thereinside.

The blades 123 may protrude from an upper surface of the outer body 122b.

Figure 7:
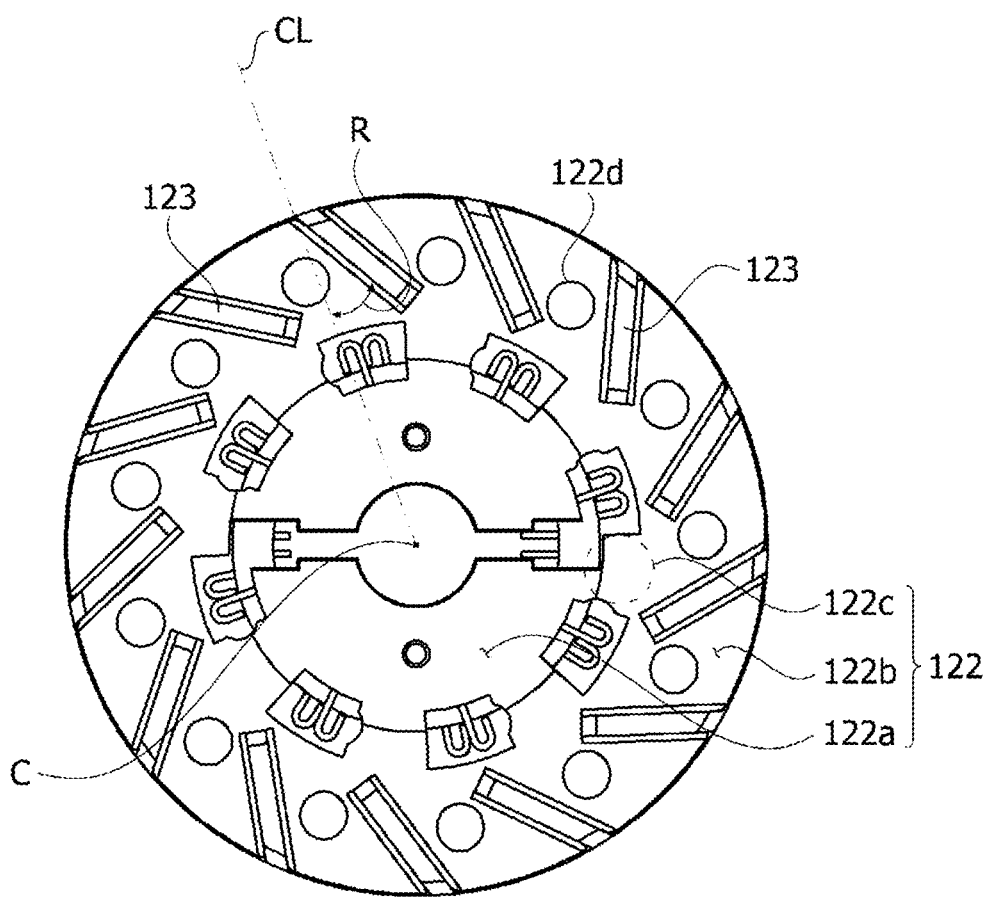
FIG. 7 is a view showing an angle of attack of a blade.

FIG. 7 is a view showing an angle of attack of the blade.

Referring to FIG. 7, the blades 123 may protrude from the upper surface of the outer body 122b at regular intervals in a circumferential direction with respect to a center C of rotation of the rotor assembly 100 (see FIG. 1).

In this case, the blades 123 may be formed to be inclined so as to form an angle of attack R with respect to the reference line CL formed in a radial direction at the center C of rotation of the rotor assembly 100.

A cooling hole 122*d* may be provided between the blades 123. That is, the cooling hole 122*d* may be disposed between the blades 123 which are adjacent to each other with respect to a circumferential direction of the rotor core 110.

The cooling hole 122*d* is configured to pass through from a lower surface of the outer body 122*b* to the upper surface and to guide air from beneath the bus bar 120 in which the rotor core 110 is located to an upper side of the bus bar 120 in which the blades 123 are located, thereby increasing cooling efficiency.

The connecting parts 122*c* serve to structurally connect the inner body 122*a* to the outer body 122*b*. The connecting parts 122*c* may be formed in the periphery of the inner body 122*a* at regular intervals and empty spaces between adjacent connecting parts 122*c* may be utilized as spaces in which the connection ends 121*b* of the terminals 121 are located.

As described above, in the motor according to the embodiment, by implementing a configuration in which the blades are formed in the bus bar to reduce the number of parts, an overall configuration of the motor may be simplified, thereby simplifying an assembly process and reducing a total size of the motor.

As described above, the rotor assembly, according to the exemplary embodiment of the present invention, and the motor including the rotor assembly, have been described in detail with reference to the accompanying drawings.

While the present invention has been particularly described with reference to exemplary embodiments, it will be understood by those of skilled in the art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

REFERENCE NUMERALS

100: ROTOR ASSEMBLY
110: ROTOR CORE
120: BUS BAR
121: TERMINAL
122: BODY
123: BLADE
130: FAN MEMBER
200: STATOR
300: ROTATION SHAFT

The invention claimed is:

1. A rotor assembly comprising:
a rotor core around which coils are wound; and
a bus bar including terminals connected to the coils and a body, which is disposed on the rotor core and coupled to the terminals and includes a plurality of blades,
wherein the body includes an inner body, an outer body, and connecting parts,
the outer body is disposed outside the inner body,
the connecting parts are arranged in a periphery of the inner body at regular intervals and connect the inner body to the outer body,
the terminals are disposed in the inner body so that connection ends of the terminals are disposed between the adjacent connecting parts,
the plurality of blades protrude from an upper surface of the outer body and are arranged in a circumferential direction with respect to a center of rotation at regular intervals,
the outer body includes a cooling hole formed to pass through from a lower surface thereof to the upper surface, and
the cooling hole is disposed between adjacent blades.

2. The rotor assembly of claim 1, wherein the inner body includes
a shaft hole formed at a center thereof.

3. The rotor assembly of claim 2, wherein the blades are formed to be inclined so as to form an angle of attack with respect to a reference line formed in a radial direction at a center of rotation of the rotor core.

4. The rotor assembly of claim 1, wherein:
the terminals include a terminal body formed in an annular shape; and
the connection ends of the terminals are arranged in a periphery of the terminal body.

5. A motor comprising:
a rotor assembly including a rotor core around which coils are wound; and a bus bar including terminals connected to the coils and a body, which is disposed on the rotor core and coupled to the terminals and includes a plurality of blades;
a stator disposed outside the rotor assembly; and
a rotation shaft coupled to the body,
wherein the body includes an inner body, an outer body, and connecting parts,
the outer body is disposed outside the inner body,
the connecting parts are arranged in a periphery of the inner body at regular intervals and connect the inner body to the outer body,
the terminals are disposed in the inner body so that connection ends of the terminals are disposed between adjacent connecting parts,
the plurality of blades protrude from an upper surface of the outer body and are arranged in a circumferential direction with respect to a center of rotation at regular intervals,
the outer body includes a cooling hole formed to pass through from a lower surface thereof to the upper surface, and
the cooling hole is disposed between adjacent blades.

6. The motor of claim 5, wherein the inner body includes a shaft hole formed at a center thereof.

7. The motor of claim 6, wherein the blades are formed to be inclined so as to form an angle of attack with respect to a reference line formed in a radial direction at a center of rotation of the rotor core.

8. The motor of claim 5, wherein:
the terminals include a terminal body formed in an annular shape; and
the connection ends of the terminals are arranged in a periphery of the terminal body.

\* \* \* \* \*